(12) United States Patent
Li et al.

(10) Patent No.: US 11,952,440 B2
(45) Date of Patent: Apr. 9, 2024

(54) PROCESS FOR THE PREPARATION OF POLYETHYLENES

(71) Applicant: SABIC GLOBAL TECHNOLOGIES B.V., Bergen op Zoom (NL)

(72) Inventors: Lidong Li, Geleen (NL); Salah Al Hubish, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 462 days.

(21) Appl. No.: 17/285,958

(22) PCT Filed: Oct. 17, 2019

(86) PCT No.: PCT/EP2019/078183
§ 371 (c)(1),
(2) Date: Apr. 16, 2021

(87) PCT Pub. No.: WO2020/088942
PCT Pub. Date: May 7, 2020

(65) Prior Publication Data
US 2021/0371553 A1    Dec. 2, 2021

(30) Foreign Application Priority Data
Oct. 31, 2018 (EP) .................................... 18203749

(51) Int. Cl.
*C08F 110/02* (2006.01)
*C08K 5/17* (2006.01)
*C08K 5/5445* (2006.01)

(52) U.S. Cl.
CPC .............. *C08F 110/02* (2013.01); *C08K 5/17* (2013.01); *C08K 5/5445* (2021.01); *C08F 2410/02* (2013.01); *C08F 2420/00* (2013.01)

(58) Field of Classification Search
CPC .............. C08F 110/02; C08F 2410/02; C08F 2420/00; C08K 5/17; C08K 5/5445
See application file for complete search history.

(56) References Cited

U.S. PATENT DOCUMENTS 3,475,394 A * 10/1969 Yuji ....................... C08F 10/00
502/103

FOREIGN PATENT DOCUMENTS

| EP | 1764378 A1 | 3/2007 |
|---|---|---|
| WO | 0066637 A1 | 11/2000 |
| WO | 2006130953 A1 | 12/2006 |
| WO | 2017032683 A1 | 3/2017 |

OTHER PUBLICATIONS

International Search Report for International Application No. PCT/EP2019/078183, International Filing Date Oct. 17, 2019, dated Dec. 13, 2019, 5 pages.
Written Opinion for International Application No. PCT/EP2019/078183, International Filing Date Oct. 17, 2019, dated Dec. 13, 2019, 6 pages.

* cited by examiner

*Primary Examiner* — Angela C Scott
(74) *Attorney, Agent, or Firm* — CANTOR COLBURN LLP

(57) ABSTRACT

The present invention relates to a process for the production of a polyethylene by polymerisation of a reaction mixture comprising ethylene in the presence a catalyst system and an antistatic agent according to formula I: (I) wherein R1, R2 and R3 stand for a moiety according to formula II or a hydrocarbon moiety having 1 to 20 carbon atoms (II) wherein each of R4, R5 and R6 may be the same or different, and wherein each of R4, R5 and R6 is a hydrocarbon moiety having 1 to 10 carbon atoms, and wherein at least one of R1, R2 and R3 is a moiety according to formula II. Such process allows for the reduction of sheeting in the polymerisation reactor without compromising the polymerisation reaction kinetics.

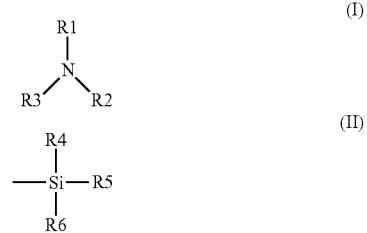

19 Claims, No Drawings

PROCESS FOR THE PREPARATION OF POLYETHYLENES

CROSS REFERENCE TO RELATED APPLICATIONS

This application is a National Stage application of PCT/EP2019/078183, filed Oct. 17, 2019, which claims the benefit of European Application No. 18203749.9, filed Oct. 31, 2018, both of which are incorporated by reference in their entirety herein.

The present invention relates to a process for the preparation of polyethylenes, particularly to preparation of polyethylenes in a gas-phase polymerisation reaction. In particular, the invention relates to a process for the preparation of polyethylenes with reduced occurrence of sheeting.

In the production of polyethylenes, polymerisation occurs by reaction between monomeric molecules, including ethylene, and between monomeric molecules and the formed polymeric molecules. Such polymeric molecules form particulates.

The preparation of polyethylenes in accordance with the present invention may be performed in a polymerisation process operated at a pressure of below 20 MPa, preferably between 1.0 and 10 MPa. In ethylene polymerisation processes, such are referred to as low-pressure polymerisation processes. Such low-pressure polymerisation processes typically are performed in the presence of a catalyst system. Such low-pressure polymerisation processes include solution-based polymerisation processes, slurry-based polymerisation processes, and gas-phase polymerisation processes.

A particularly widespread polymerisation process for the production of polyethylene is the gas-phase polymerisation process. In such process, within the volume of the polymerisation reactor, the reactive molecules and the formed particles are commonly present in a fluidised bed state, wherein by control of flow conditions of the feed reactants, the formed particulates are kept in a fluidised mixture with such feed reactants, and in the commonly employed continuous reactors, are gradually transported towards a product outlet of the reactor.

Gas-phase polymerisation processes for the production of polyethylenes are typically utilised in a continuously operating mode. A typical description of gas-phase polymerisation processes can be found in WO2017/032683A1.

The ability to operate such polymerisation processes in a continuous mode is in view of process economics an essential requirement. The longer the intervals of continuous operation of the plant between shutdowns, the more beneficial this is from a profitability viewpoint. A variety of factors may contribute to or even lead to shutdowns, including inconsistency of the quality of the employed catalyst, inconsistencies in process control, impurities in the feedstock or other ingredients that are used in the process, or downstream failures in e.g. processing of the polymer in an extruder.

A particular phenomenon that tends to occur in polymerisation reactions of ethylene, particularly in gas-phase polymerisation, is the phenomenon of sheeting.

During the fluidised state, flow of particulate matter can lead to occurrence of static electric charges within the fluidised bed. As a result of the build-up of such static charges, certain disadvantageous effects may occur, such as the so-called sheeting. In this context, sheeting is to be understood to be the formation of a deposited layer of polymeric material on the inner wall of the polymerisation reactor.

Such build-up of polymeric material is an undesirable effect that needs to be prevented. When sheeting occurs, the polymeric material the forms the sheeting layer is subjected to far more severe reaction conditions, predominantly due to the far larger residence time and local excessive heat generation due to the occurrence of 'hot-spots', than the particles that are produced and transported via the fluidised bed, and exit the reactor following the desired and predetermined reaction time.

It is well known that occurrence of sheeting can be attributed to static charge effects. The high superficial gas velocity of the gas stream in the reactor causes turbulent particle flow. This results in friction and collisions between the polymer particles, and between the polymer particles and the wall of the reactor, as a result of which static charges are generated on the surface of the polymer particles and/or on the inner wall of the reactor, which is known as frictional electrification or triboelectrification. When the static charge accumulates to such level as to overcome the force exerted by the gas stream, polymer particles may migrate to the reactor wall and may stick to the reactor wall, which initiates the ensuing wall sheeting.

Gas-phase polymerisation reactors for the polymerisation of ethylene typically are designed such as to contain a so-called expanded zone or dome. In this zone, the inner diameter increases, so that the flow volume decreases. In this zone, particles having developed a static charge may then be confronted with reduced gas flow forces, as a result of which the static forces may exceed the flow forces and the static force may then attract the particle to the reactor wall. This particularly is referred to as dome sheeting, and particularly is prone to occur during polymerisation processes wherein the catalyst system is of the metallocene type.

When polymeric material that has formed part of such sheeting layer is released from that sheeting, for example as a result of forces exerted by the fluidised particulate that form the reactor contents, such material is then transported along with the regular polymeric particles out of the reactor as part of the product of the polymerisation. In that product stream, the material from the sheeting layer forms contaminations. Such contaminations may be visible contaminations, e.g. in the form of discolourations or lumps, but also in the form of qualitative contaminations, inducing defects into the products that are manufactured from the polyethylenes that are produced in the gas-phase reaction; an example thereof are gels or fish-eyes that may occur in films that are produced from such polyethylenes. Furthermore, such defected lumps of products that are released from the reactor inner wall may obstruct the discharge system of the reactor, as a result of which the reactor may need to be stopped for removal of the obstruction or even cleaning of the reactor.

Many methods have been disclosed in the art to alleviate stating charge build-up during the polymerisation process. These methods may be grouped into three approaches, namely modification of the inner wall of the reactor to reduce the tendency of static charge build-up, for example by coating of the inner wall, modification of the catalyst formulation or recipe to reduce static charge formation tendency in the catalyst, and supply of antistatic agents to the reaction zone.

The modification of the inner wall of the reactor involves significant efforts in design or re-design of the reactor. Moreover, where a coating solution is employed, the desired effect may be lost when the coating disappears from the wall, which may occur over the life of a polymerisation reactor, which typically is required to last for a lengthy period, not uncommonly for multiple decades. Furthermore, a solution that provides the desired effect for one particular operational setting of the reactor, for example polymerisation employing one particular catalyst system, not necessarily provides the desired effect for a different operational setting. Thus, such reactor wall modification provides certain disadvantages.

The modification of the catalyst recipe to reduce the tendency for static charge build-up may be a solution to steer the desired antistatic effect without the disadvantages as stated above for the solutions based on modification of the reactor wall. However, it is typically undesired to modify the catalyst recipe as this also may affect other predominant parameters, such as the reactivity, the productivity, the nature of the polymers that are produced, and, in copolymerisation of ethylene with further monomers, the reactivity towards the comonomers and the quantity of comonomer incorporation, amongst others.

There thus appears to be advantages in being able to control static charge build-up by supply of a separate antistatic agent to the ingredients that are introduced to the reactor. A small portion of such antistatic agent may be provided to the contents of the reactor. However, it is important that the antistatic agent is of such nature that is has least effect on the further properties of the polymerisation reaction and the polymer produced as a result thereof.

This is a particular consideration that plays a role in gas-phase polymerisations to produce polyethylenes wherein catalyst systems of the metallocene-type are employed. The employed antistatic agent, and the quantities thereof, must not affect the polymerisation reaction such that the productivity of the reaction is disadvantageously affected, whilst still performing its function as antistatic agent such that occurrence of the undesired sheeting is reduced or eliminated.

In the art, several types of antistatic agents have been examined. For example, WO2000/66637A1 describes the use of bis(2-hydroxyethyl)tallowamine as antistatic agent. In WO2006/130953A1, stearylamine is described as antistatic agent. However, whilst such agents may provide the antistatic function, they detrimentally affect the productivity of the catalysts, in particular in metallocene-catalysed ethylene polymerisation reactions, when supplied as separate compounds.

For these reasons, there maintains a need to provide a process for preparation of polyethylenes via gas-phase polymerisation wherein the static build-up is reduced without affecting the catalytic activity of the catalyst system that is employed in the polymerisation, such as by being reactive towards the catalyst or the cocatalyst.

This is now achieved by a process for the production of a polyethylene by polymerisation of a reaction mixture comprising ethylene in the presence a catalyst system and an antistatic agent according to formula I:

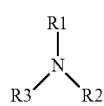

formula I wherein R1, R2 and R3 stand for a moiety according to formula II or a hydrocarbon moiety having 1 to 20 carbon atoms

formula II wherein each of R4, R5 and R6 may be the same or different, and wherein each of R4, R5 and R6 is a hydrocarbon moiety having 1 to 10 carbon atoms, and wherein at least one of R1, R2 and R3 is a moiety according to formula II.

It is preferred that each of R1, R2 and R3 in formula I are moieties according to formula II. Preferably, moieties R1, R2 and R3 in formula I are the same. It is preferred that each of R4, R5 and R6 in formula II are linear or branched hydrocarbon moieties having 1-5 carbon atoms. It is preferred that each of R4, R5 and R6 in formula II are the same.

The process may be a solution-based polymerisation process, a slurry-based polymerisation process, or a gas-phase polymerisation process. It is particularly preferred that the process is a gas-phase polymerisation process.

The invention also relates to the use of the antistatic according to formula I for reduction of static charge build-up in a gas-phase ethylene polymerisation process.

In the context of the present invention, a hydrocarbon moiety is to be understood to be a moiety consisting of hydrogen and carbon atoms. A hydrocarbon moiety may be linear or branched. A hydrocarbon moiety may be saturated or alternatively it may comprise one or more carbon-carbon unsaturated bonds. Preferably, a hydrocarbon moiety is an unsaturated linear moiety consisting of hydrogen and carbon atoms.

The antistatic agent may for example be a compound selected from tris(trialkylsilyl)amines, N,N-bis(trialkylsilyl)alkylamines, and N,N-dialkyl(trialkylsilyl)amines.

For example, the antistatic agent may be a compound selected from tris(trimethylsilyl)amine, tris(triethylsilyl)amine, tris(triisopropylsilyl)amine, and tris(triisobutylsilylamine).

For example, the antistatic agent may be a compound selected from N,N-bis(trimethylsilyl)methylamine, N,N-bis(trimethylsilyl)ethylamine, N,N-bis(trimethylsilyl)propylamine, N,N-bis(trimethylsilyl)n-butylamine, N,N-bis(trimethylsilyl)isobutylamine, N,N-bis(trimethylsilyl) hexylamine, N,N-bis(trimethylsilyl)octylamine, N,N-bis(trimethylsilyl)decylamine, N,N-bis(trimethylsilyl) dodecylamine, N,N-bis(trimethylsilyl)tetradecylamine,N,N-bis(trimethylsilyl)hexadecylamine, and N,N-bis(trimethylsilyl)octadecylamine.

For example, the antistatic agent may be a compound selected from N,N-bis(triethylsilyl)methylamine, N,N-bis(triethylsilyl)ethylamine, N,N-bis(triethylsilyl)propylamine, N,N-bis(triethylsilyl)n-butylamine, N,N-bis(triethylsilyl) isobutylamine, N,N-bis(triethylsilyl)hexylamine, N,N-bis(triethylsilyl)octylamine, N,N-bis(triethylsilyl)decylamine, N,N-bis(triethylsilyl)dodecylamine, N,N-bis(triethylsilyl) tetradecylamine, N-bis(triethylsilyl)hexadecylamine, and N,N-bis(triethylsilyl)octadecylamine.

For example, the antistatic agent may be a compound selected from N,N-bis(triisopropylsilyl)methylamine, N,N-bis(triisopropylsilyl)ethylamine, N,N-bis(triisopropylsilyl) propylamine, N,N-bis(triisopropylsilyl)n-butylamine, N,N- bis(triisopropylsilyl)isobutylamine, N,N-bis(triisopropylsilyl)hexylamine, N,N-bis(triisopropylsilyl)octylamine, N,N-bis(triisopropylsilyl)decylamine, N,N-bis(triisopropylsilyl)dodecylamine, N,N-bis(triisopropylsilyl)tetradecylamine, N,N-bis(triisopropylsilyl)hexadecylamine, and N,N-bis(triisopropylsilyl)octadecylamine.

For example, the antistatic agent may be a compound selected from N,N-bis(triisobutylsilyl)methylamine, N,N-bis(triisobutylsilyl)ethylamine, N,N-bis(triisobutylsilyl)propylamine, N,N-bis(triisobutylsilyl)n-butylamine, N,N-bis(triisobutylsilyl)isobutylamine, N,N-bis(triisobutylsilyl)hexylamine, N,N-bis(triisobutylsilyl)octylamine, N,N-bis(triisobutylsilyl)decylamine, N,N-bis(triisobutylsilyl)dodecylamine, N,N-bis(triisobutylsilyl)tetradecylamine,N,N-bis(triisobutylsilyl)hexadecylamine, and N,N-bis(triisobutylsilyl)octadecylamine.

For example, the antistatic agent may be a compound selected from N,N-dimethyl(trimethylsilyl)amine, N,N-diethyl(trimethylsilyl)amine, N-diisopropyl(trimethylsilyl)amine, N,N-diisobutyl(trimethylsilyl)amine, N,N-di-n-butyl(trimethylsilyl)amine, N,N-dihexyl(trimethylsilyl)amine, N,N-dioctyl(trimethylsilyl)amine, N,N-didecyl(trimethylsilyl)amine, N,N-didocecyl(trimethylsilyl)amine, N,N-ditetradecyl(trimethylsilyl)amine, N,N-dihexadecyl(trimethylsilyl)amine, and N,N-dioctadecyl(trimethylsilyl)amine.

For example, the antistatic agent may be a compound selected from N,N-dimethyl(triethylsilyl)amine, N,N-diethyl(triethylsilyl)amine, N,N-diisopropyl(triethylsilyl)amine, N,N-diisobutyl(triethylsilyl)amine, N,N-di-n-butyl(triethylsilyl)amine, N,N-dihexyl(triethylsilyl)amine, N,N-dioctyl(triethylsilyl)amine, N,N-didecyl(triethylsilyl)amine, N,N-didocecyl(triethylsilyl)amine, N,N-ditetradecyl(triethylsilyl)amine, N,N-dihexadecyl(triethylsilyl)amine, and N,N-dioctadecyl(triethylsilyl)amine.

The antistatic agent may for example be a compound selected from tris(trimethylsilyl)amine, tris(triethylsilyl)amine, tris(triisopropylsilyl)amine, tris(triisobutylsilylamine), N,N-bis(trimethylsilyl)methylamine, N,N-bis(trimethylsilyl)dodecylamine, and N,N-bis(trimethylsilyl)octadecylamine.

The antistatic agent may for example be present as a catalyst component in an amount of ≥0.1 and ≤20.0 wt % with regard to the weight of the metallocene complex, preferably ≥0.5 and ≤15.0 wt %, more preferably ≥0.5 and ≤10.0 wt %. The use of the antistatic agent in such quantity compared to the metallocene complex is believed to contribute to the realisation of the productivity in polymerisation whilst providing the antistatic effect to an adequate level, in particular while operating a gas-phase ethylene polymerisation reaction in continuous mode.

It is preferred that the antistatic agent is present as a catalyst component in a quantity such that the molar ratio of the antistatic agent to the active species of the catalyst system is ≥0.001 and ≤10.0, preferably ≥0.005 and ≤5.0, more preferably ≥0.005 and ≤1.0.

The antistatic agent may be directly supplied to the polymerisation reactor via a monomer feed line, a comonomer feed line, a recycle gas feed line, or as a solution in a separate metering line. Where the polymerisation reactor comprises a distributor plate, the antistatic agent may be supplied to the reactor above the distributor plate or below the distributor plate. The antistatic agent may be supplied in a continuous mode, or intermittently based on monitoring of static charge build-up.

The amount of antistatic agent to be provided to the polymerisation reaction may for example be ≥1 and ≤1000 ppm by weight with regard to the weight of the polyethylene polymer that is produced, preferably ≥1 and ≤100 ppm, more preferably ≥1 and ≤20 ppm.

The antistatic agent may be premixed with the catalyst prior to introduction into the reactor. The antistatic agent may be premixed with the cocatalyst aid prior to introduction into the reactor.

The antistatic agent may be supplied to the reactor as a solution in a solvent. Suitable solvents may for example be heptane, hexane, isopentane and toluene.

The catalyst system may be a catalyst system common in the gas-phase polymerisation of ethylene. For example, the catalyst system may be a Ziegler-Natta-type catalyst system, a chromium-based catalyst system, also referred to as a Phillips-type catalyst system, a metallocene-type catalyst system, or a non-metallocene single-site catalyst system. The catalyst system may be unsupported or supported on an inert carrier.

A Ziegler-Natta-type catalyst system may for example comprise at least one titanium-comprising compound and at least one magnesium-containing compound. A chromium-based catalyst system may for example comprise a catalyst based on chromium oxide. A metallocene-type catalyst system may for example be a system comprising a catalytic compound having a half or full sandwich structure comprising one or two cyclopentadienyl-derived ligands, and a transition metal selected from group 3 to 8, preferably 4 to 6, or from the lanthanide and actinide series of the Periodic Table of the Elements, preferably Ti, Hf or Zr. Non-metallocene single-site catalyst systems may for example include phosphinimine complexes, borabenzene complexes, transition metal complexes comprising ligands containing pyrrolyl rings, pyridyl-bridged bisphosphinimine complexes, and ketimide-ligand based complexes.

When employing a metallocene-type catalyst system, it is preferred that the metallocene catalyst is activated by a cocatalyst. The cocatalyst is preferably an organoaluminium compound or a non-coordinating anionic compound. Examples of suitable cocatalysts are methylaluminoxane, also referred to as MAO, modified methylaluminoxane, borane or borate compounds such as perfluorphenylborane, triethylammonium tetrakis(pentafluorphenyl)borate, triphenylcarbenium tetrakis(pentafluorphenyl)borate, trimethylsilyl tetrakis(pentafluorphenyl)borate, and boratabenzenes such as 1-pentafluorphenyl-1,4-dihydroboratabenzene, tributylammonium-1,4-bis(pentafluorphenyl)boratabenzene, triphenylcarbenium-1-methylboratabenzene. Preferably, the cocatalyst is methylaluminoxane.

Preferably a cocatalyst aid may be used. The cocatalyst aid preferably is an aluminium compound selected from a trialkyl aluminium or a dialkylaluminiumhydride, wherein the alkyl moieties are moieties having 1 to 10 carbon atoms. For example, the cocatalyst aid may be selected from trimethyl aluminium, triethyl aluminium, tri-n-propyl aluminium, tri-isopropyl aluminium, tri-n-butyl aluminium, tri-isobutyl aluminium, dimethyl aluminiumhydride, diethyl aluminiumhydride, di-isopropyl aluminiumhydride, di-n-propyl aluminiumhydride, di-isobutyl aluminiumhydride, and di-n-butyl aluminiumhydride. Preferably, the cocatalyst aid is tri-isobutyl aluminium.

In the metallocene-type catalyst system, the metallocene catalyst system with the cocatalyst may be supported on an inert carrier, also referred to as support. The support may be organic or inorganic. Preferably the support is porous. Exemplary organic support material are crosslinked or functionalised polystyrenes, polyvinylchloride, and crosslinked polyethylenes. Exemplary inorganic support materials are silica, alumina, silica-alumina, inorganic chlorides such as MgCl$_2$, talc and zeolite. The preferred particle size of the support is from 10 to 120 μm. preferably, the support is silica. The pore volume of the support preferably is ≥0.5 and ≤3.0 cm$^3$/g. preferably, the surface area of the support material is ≥50 and ≤500 m$^2$/g. the silica that may be employed as support in for the catalyst system preferably is dehydrated prior to use in preparation of the catalyst system.

It is preferred that the metallocene-type catalyst system comprises a metallocene complex supported on a porous silica support having a particle size of from 10 to 120 μm, a pore volume of ≥0.5 and ≤3.0 cm$^3$/g, and a surface area of ≥50 and ≤500 m$^2$/g, as determined in accordance with ISO 9276-2 (2014).

In the metallocene-type catalyst system, the metallocene-type catalyst system preferably comprises a metallocene complex according to formula III:

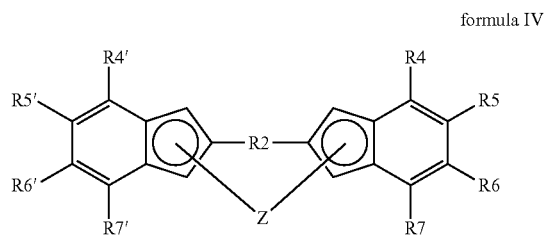

formula III wherein:

Z is a moiety selected from ZrX$_2$, HfX$_2$, or TiX$_2$, wherein X is selected from the group of halogens, alkyls, aryls and aralkyls;

R2 is a bridging moiety containing at least one sp2 hybridised carbon atom;

each R1, R1', R3, R3', R4, R4' R5 and R5' are hydrogen or a hydrocarbon moiety comprising 1-20 carbon atoms.

In the metallocene complex according to formula III, R4 may be fused with R5 to form a 2-indenyl moiety. The 2-indenyl moiety formed by the fused R4 with R5 may be substituted or unsubstituted. In the metallocene complex according to formula III, R4' may be fused with R5' to form a 2-indenyl moiety. The 2-indenyl moiety formed by the fused R4' with R5' may be substituted or unsubstituted. For example, in the metallocene complex according to formula III, both R4 with R5 and R4' with R5' may be fused to each form a 2-indenyl moiety, which may be substituted or unsubstituted. It is preferred that the 2-indenyl moiety formed by fusion of R4 with R5 and the 2-indenyl moiety formed by fusion of R4' and R5' are the same.

In the metallocene complex according to formula III, R3 may be fused with R4 to form a 1-indenyl moiety. The 1-indenyl moiety formed by the fused R3 with R4 may be substituted or unsubstituted. In the metallocene complex according to formula III, R3' may be fused with R4' to form a 1-indenyl moiety. The 1-indenyl moiety formed by the fused R3' with R4' may be substituted or unsubstituted. For example, in the metallocene complex according to formula III, both R3 with R4 and R3' with R4' may be fused to each form a 1-indenyl moiety, which may be substituted or unsubstituted. It is preferred that the 1-indenyl moiety formed by fusion of R3 with R4 and the 1-indenyl moiety formed by fusion of R3' and R4' are the same.

Preferably, in the metallocene complex according to formula III, R4 with R5 and R4' and R5' are fused to form a complex according to formula IV:

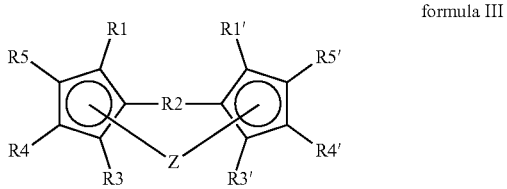

formula IV wherein:

R2 is a bridging moiety containing at least one sp2 hybridised carbon atom;

each R4, R4', R7 and R7' are hydrogen or moieties comprising 1-10 carbon atoms, wherein each R4, R4', R7 and R7' are the same;

each R5, R5', R6 and R6' are hydrogen or moieties comprising 1-10 carbon atoms, wherein each R5, R5', R6 and R6' are the same; and Z is a moiety selected from ZrX$_2$, HfX$_2$, or TiX$_2$, wherein X is selected from the group of halogens, alkyls, aryls and aralkyls.

Preferably X is a monovalent anionic group, selected from the group consisting of halogen (F, Cl, Br or I), a C1-C20 hydrocarbyl group or a C1-C20 alkoxy group. Preferably X is a methyl group, Cl, Br or I, most preferably methyl or Cl. For example, Z may be a moiety selected from ZrCl$_2$, HfCl$_2$ or TiCl$_2$.

The bridging moiety R2 preferably is a substituted or unsubstituted methylene, 1,2-phenylene or 2,2'-biphenylene moiety. For example, R2 may be a substituted or unsubstituted 2,2'-biphenylene moiety.

For example, the metallocene complex may be a zirconium-containing compound selected from [2,2'-bis(2-indenyl)biphenyl]zirconium dichloride, [2,2'-bis(1-indenyl)biphenyl]zirconium dichloride, [(2-(2-indenyl)-2'-cyclopentadienyl)biphenyl]zirconium dichloride, [(2-(1-indenyl)-2'-cyclopentadienyl)biphenyl]zirconium dichloride, [1,4-bis(2-indenyl)phenyl]zirconium dichloride, [1,4-bis(1-indenyl)phenyl]zirconium dichloride, [(1-(1-indenyl)-4-cyclopentadienyl)phenyl]zirconium dichloride, [(1-(2-indenyl)-4-cyclopentadienyl)phenyl]zirconium dichloride, [(1-(1-indenyl)-1-cyclopentadienyl-1-methyl) ethyl]zirconium dichloride, [(1-(2-indenyl)-1-cyclopentadienyl-1-methyl)ethyl]zirconium dichloride, [(1,1'-bis(1-indenyl)-1-methyl)-ethyl]zirconium dichloride, [(1,1'-bis(2-indenyl)-1-methyl)-ethyl]zirconium dichloride, [(1-(1-indenyl)-1-cyclopentadienyl)methyl]zirconium dichloride, [(1-(2-indenyl)-1-cyclopentadienyl)methyl]zirconium dichloride, [1,1'-bis(2-indenyl)methyl]zirconium dichloride, and [1,1'-bis(1-indenyl)methyl]zirconium dichloride For example, the metallocene complex may be a hafnium-containing compound selected from [2,2'-bis(2-indenyl)biphenyl]hafnium dichloride, [2,2'-bis(1-indenyl)biphenyl] hafnium dichloride, [(2-(2-indenyl)-2'-cyclopentadienyl) biphenyl]hafnium dichloride, [(2-(1-indenyl)-2'-cyclopentadienyl)biphenyl]hafnium dichloride, [1,4-bis(2-indenyl)phenyl]hafnium dichloride, [1,4-bis(1-indenyl) phenyl]hafnium dichloride, [(1-(1-indenyl)-4-cyclopentadienyl)phenyl]hafnium dichloride, [(1-(2-indenyl)-4-cyclopentadienyl)phenyl]hafnium dichloride,

[(1-(1-indenyl)-1-cyclopentadienyl-1-methyl)ethyl]hafnium dichloride, [(1-(2-indenyl)-1-cyclopentadienyl-1-methyl)ethyl]hafnium dichloride, [(1,1'-bis(1-indenyl)-1-methyl)ethyl]hafnium dichloride, [(1,1'-bis(2-indenyl)-1-methyl)ethyl]hafnium dichloride, [(1-(1-indenyl)-1-cyclopentadienyl)methyl]hafnium dichloride, [(1-(2-indenyl)-1-cyclopentadienyl)methyl]hafnium dichloride, [1,1'-bis(2-indenyl)methyl]hafnium dichloride, and [1,1'-bis(1-indenyl)methyl]hafnium dichloride For example, the metallocene complex may be a titanium-containing compound selected from [2,2'-bis(2-indenyl)biphenyl]titanium dichloride, [2,2'-bis(1-indenyl)biphenyl]titanium dichloride, [(2-(2-indenyl)-2'-cyclopentadienyl)biphenyl]titanium dichloride, [(2-(1-indenyl)-2'-cyclopentadienyl)biphenyl]titanium dichloride, [1,4-bis(2-indenyl)phenyl]titanium dichloride, [1,4-bis(1-indenyl)phenyl]titanium dichloride, [(1-(1-indenyl)-4-cyclopentadienyl)phenyl]titanium dichloride, [(1-(2-indenyl)-4-cyclopentadienyl)phenyl]titanium dichloride, [(1-(1-indenyl)-1-cyclopentadienyl-1-methyl)ethyl]titanium dichloride, [(1-(2-indenyl)-1-cyclopentadienyl-1-methyl)ethyl]titanium dichloride, [(1,1'-bis(1-indenyl)-1-methyl)ethyl]titanium dichloride, [(1,1'-bis(2-indenyl)-1-methyl)ethyl]titanium dichloride, [(1-(1-indenyl)-1-cyclopentadienyl)methyl]titanium dichloride, [(1-(2-indenyl)-1-cyclopentadienyl)methyl]titanium dichloride, [1,1'-bis(2-indenyl)methyl]titanium dichloride, and [1,1'-bis(1-indenyl)methyl]titanium dichloride For example, the metallocene complex may be selected from [2,2'-bis(2-indenyl)biphenyl]hafnium dichloride, [2,2'-bis(2-indenyl)biphenyl]zirconium dichloride, [2,2'-bis(2-indenyl)biphenyl]titanium dichloride, [2,2'-bis(1-indenyl)biphenyl]hafnium dichloride, [2,2'-bis(1-indenyl)biphenyl]zirconium dichloride, and [2,2'-bis(12-indenyl)biphenyl]titanium dichloride. Preferably, the metallocene complex is [2,2'-bis(2-indenyl)biphenyl]zirconium dichloride.

The polyethylene that is prepared via the process of the present invention may for example be an ethylene homopolymer or an ethylene-α-olefin copolymer. The polyethylene may for example have a density of ≥850 and ≤960 kg/m³, preferably of ≥870 and ≤935 kg/m³, more preferably of ≥900 and ≤925 kg/m³. The polyethylene may for example be a copolymer comprising ≥1.0 and ≤30.0 wt %, preferably ≥3.0 and ≤20.0 wt %, more preferably ≥5.0 and ≤15.0 wt %, of moieties derived from an α-olefin having ≥3 to ≤10 carbon atoms, preferably from an α-olefin selected from 1-butene, 1-hexene, 4-methyl-1-pentene, and 1-octene.

The process preferably is a gas-phase ethylene polymerisation process, more preferably a process for production of polyethylene by gas-phase polymerisation of ethylene and a further α-olefin selected from 1-butene, 1-hexene, 4-methyl-1-pentene and 1-octene. More preferably, the process is a process for production of polyethylene by gas-phase polymerisation of ethylene and ≥5.0 and ≤20.0 wt % of an α-olefin selected from 1-butene, 1-hexene, 4-methyl-1-pentene and 1-octene, with regard to the total weight of the ethylene and the α-olefin.

The feed the is introduced to the process may further comprise one or more α-olefins comprising 3 to 10 carbon atoms, preferably wherein the α-olefin comprising 3 to 10 carbon atoms is selected from 1-butene, 4-methyl-1-pentene, 1-hexene or 1-octene, preferably wherein the feed comprises ≥5.0 and ≤20.0 wt % of the α-olefin comprising 3 to 10 carbon atoms with regard to the total weight of ethylene and the α-olefin comprising 3 to 10 carbon atoms.

The process may for example be performed in a continuous gas-phase polymerisation reactor, preferably a fluidised-bed gas-phase polymerisation reactor.

Preferably, the process is continuously operated by providing to a reactor a continuous supply of reactant feed comprising ethylene, a continuous supply of the metallocene-type catalyst system, and a continuous supply of the antistatic agent, such that the molar ratio of the metallocene complex in the metallocene-type catalyst system to the antistatic agent is maintained in the range of 0.01 and 100, preferably 0.1 and 50, more preferably 1.0 and 50, and wherein a product stream comprising the polyethylene produced in the polymerisation reactor is withdrawn continuously from the reactor. The use of the antistatic agent in such quantities contributes to the ability to operate a polyethylene polymerisation process using a metallocene-type catalyst in a continuous mode in commercial large-scale polymerisation reactors without the occurrence of sheeting.

The invention will now be illustrated by the following non-limiting examples.

Materials

| | |
|---|---|
| Metallocene | [2,2'-bis(2-indenyl)biphenyl]zirconium dichloride, CAS reg. nr. 312968-31-3, obtainable from Innovasynth Technologies |
| Support | Silica 955, obtainable from W. R. Grace & Co |
| Cocatalyst | Methyl aluminoxane (MAO), CAS reg. nr. 29429-58-1, obtainable from W. R. Grace & Co |
| Cocatalyst aid | Triisobutyl aluminium (TIBAL), CAS reg. nr. 100-99-2, obtainable from Sigma-Aldrich |
| Antistatic agents | |
| AA1 | Tris(trimethylsilyl)amine, CAS reg. nr. 1586-73-8, obtainable from Acros Chemicals |
| AA2 | N,N-Diisopropylethylamine, CAS reg. nr. 7087-68-5 |
| AA3 | Atmer 163, a fatty alkyl dihydroxyethyl amine, CAS reg. nr. 107043-84-5, obtainable from Croda |
| AA4 | Hostastat FE 2, a fatty acid ester, CAS reg. nr. 183563-20-4, obtainable from Clariant |
| AA5 | Octastat 5000, obtainable from Octel Corporation |

Preparation of Supported Metallocene Complex

The support was pre-dehydrated at 600° C. for 4 hours. 3 g of the pre-dehydrated support was charged into a 100 ml two-neck Schlenk flask in a glovebox under nitrogen atmosphere, followed by addition of 15 ml of toluene. After shaking, a suspension was obtained. 0.052 g of the metallocene was activated by mixing it with 6.3 ml of a 10 wt % solution of the cocatalyst in toluene in a 25 ml vial at room temperature for 10 min in the glovebox, also under nitrogen atmosphere. The activated metallocene was transferred into the suspension. The mixture was heated to 70° C. and maintained at that temperature for 1 hour. Subsequently, the product was dried at 70° C. under vacuum to obtain the supported catalyst, which was isolated as free-flowing powder. The supported catalyst contained 0.24 wt % of Zr and 7.2 wt % of Al, which translates to a molar ratio of Al to Zr of ca. 100.

A. Preparation of Mixtures of Cocatalyst Aid and Antistatic Agents

Mixtures of cocatalyst aid and antistatic agents were prepared according to the below method, using the materials and quantities of such materials as presented in the below table.

To a 50 ml vial, 15 ml of hexane was charged in a glovebox under nitrogen atmosphere. 5 ml of the cocatalyst aid was added to the vial, followed by a given quantity and type of antistatic agent. The obtained solution contained 1M of the cocatalyst aid.

| Experiment | Antistatic agent | Quantity | Molar ratio of cocatalyst aid to antistatic agent | Appearance of obtained solution |
|---|---|---|---|---|
| A1 | AA1 | 0.5 g | 10:1 | Colourless |
| A2 | AA1 | 1.6 g | 3:1 | Colourless |
| A3 | AA1 | 2.3 g | 2:1 | Colourless |
| A4 | AA1 | 4.7 g | 1:1 | Colourless |
| A5 | AA1 | 9.4 g | 1:2 | Light yellow |
| A6 | AA2 | 0.9 g | 3:1 | Colourless |
| A7 | AA2 | 2.6 g | 1:1 | Colourless |
| A8 | AA3 | 2.0 g | 3:1 | Light yellow |
| A9 | AA3 | 6.0 g | 1:1 | Light yellow |
| A10 | AA4 | 2.4 g | 3:1 | Light yellow |
| A11 | AA5 | 3.1 g | 3:1 | Light yellow |
| A12 | —* | — | — | — |

*A12 represents a cocatalyst solution without any antistatic agent, and was used for comparative purposes to demonstrate the productivity of the catalyst without any effect of an antistatic agent.

B. Polymerisation Experiments

The effect of the antistatic agents prepared according to the table above was investigated by conducting a multitude of polymerisation experiments in gas phase. A 1.6 l stainless steel reactor vessel equipped with a helical stirrer and a heating/cooling control unit was heated to 110° C. at a nitrogen flow rate of 100 g/h for 2 hours. After that, the reactor was pressure purged with nitrogen, followed by a purge with ethylene. This purging cycle was repeated three times.

The reactor was then cooled to 88° C. under ethylene pressurised to 10 bar. After venting, a quantity of the cocatalyst aid/antistatic agent mixture as produced according to the above presented experiment was provided to the reactor via a cocatalyst injection pump. Ethylene was then introduced to the reactor under control of mass flow parameters to maintain an ethylene pressure in the reactor of 10 bar. Nitrogen was introduced to maintain a nitrogen pressure of 8 bar. Upon reaching a stable level of temperature and pressure, 30 mg of catalyst was injected via a catalyst injection pump and the reaction started. After 1 hour, the ethylene supply was discontinued and the reactor was cooled to 40° C. The reactor was opened after venting. The polyethylene product was collected to a sample tray and dried at ambient temperature under atmospheric pressure.

The results of the polymerisation experiments are presented in the table below.

| Experiment | Cocatalyst/ antistatic agent mixture | Quantity antistatic agent (g) | PE yield (g) | Productivity (g PE/g cat) | Sheeting |
|---|---|---|---|---|---|
| B1 | A1 | 0.075 | 28.9 | 960 | No |
| B2 | A2 | 0.240 | 30 | 987 | No |
| B3 | A3 | 0.350 | 27 | 877 | No |
| B4 | A4 | 0.700 | 25.6 | 839 | No |
| B5 | A5 | 1.400 | 24.9 | 833 | No |
| B6 | A6 | 0.140 | 1.1 | 37 | No |
| B7 | A7 | 0.390 | 0.9 | 30 | No |
| B8 | A8 | 0.300 | 12.4 | 407 | No |
| B9 | A9 | 0.900 | 0 | 0 | No |
| B10 | A10 | 0.360 | 3.8 | 128 | No |
| B11 | A11 | 0.470 | 2.9 | 98 | No |
| B12 | A12 | — | 29 | 939 | Yes |

Herein, B12 presents a control experiment to show the yield and productivity of the catalyst in the absence of any antistatic agent. Experiments B1 through B11 show that each of the employed antistatic agents indeed ensures the reduction of the static build-up such that sheeting does not occur during the conduct of the experiments. However it can be noted that the antistatic agents used in the examples B6 through B11 significantly affect the product yield and the catalyst productivity, whereas in experiments B1 through B5, representing the present invention, the provision of the antistatic effect goes together with a high yield and catalyst productivity. Even more, in example B2, the productivity and yield exceed that of the control experiment B12. This demonstrates the process of the present invention to provide an excellent balance of yield, productivity and static charge reduction.

The invention claimed is:

1. Process for the production of a polyethylene comprising polymerizing a reaction mixture comprising ethylene in the presence of a catalyst system and an antistatic agent according to formula I:

formula I wherein R1, R2 and R3 stand for a moiety according to formula II or a hydrocarbon moiety having 1 to 20 carbon atoms

formula II wherein each of R4, R5 and R6 is the same or different, and wherein each of R4, R5 and R6 is a hydrocarbon moiety having 1 to 10 carbon atoms, and wherein at least two of R1, R2 and R3 are each a moiety according to formula II.

2. Process according to claim 1, wherein the process is a solution-based polymerisation process, a slurry-based polymerisation process, or a gas-phase polymerisation process.

3. Process according to claim 1, wherein the catalyst system is a metallocene-type catalyst system.

4. Process according to claim 3 wherein the metallocene-type catalyst system comprises a metallocene complex according to formula III:

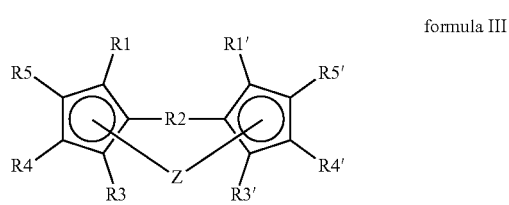

formula III wherein, in formula III:
Z is $ZrX_2$, $HfX_2$, or $TiX_2$, wherein X is a halogen, an alkyl, an aryl, or an aralkyl;
R2 is a bridging moiety containing at least one sp2 hybridised carbon atom; and
each of R1, R1', R3, R3', R4, R4', R5 and R5' is independently hydrogen or a hydrocarbon moiety comprising 1-20 carbon atoms.

5. Process according to claim 4, wherein in the metallocene complex according to formula III, R4 with R5 and R4' and R5' are fused to form a complex according to formula IV:

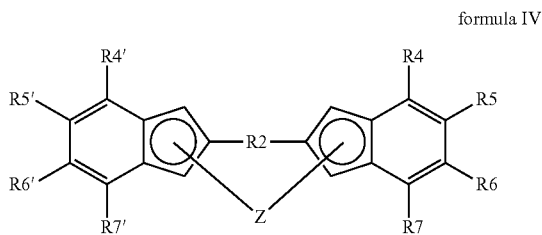

formula IV wherein, in formula IV:
R2 is a bridging moiety containing at least one sp2 hybridised carbon atom;
R4, R4', R7 and R7' are hydrogen or a moiety comprising 1-10 carbon atoms, wherein R4, R4', R7 and R7' are the same;
R5, R5', R6 and R6' are hydrogen or a moiety comprising 1-10 carbon atoms, wherein R5, R5', R6 and R6' are the same; and
Z is $ZrX_2$, $HfX_2$, or $TiX_2$, wherein X is a halogen, an alkyl, an aryl or an aralkyl.

6. Process according to claim 4, wherein the bridging moiety R2 is a substituted or unsubstituted methylene, 1,2-phenylene or 2,2'-biphenylene moiety.

7. Process according to claim 3, wherein the metallocene-type catalyst system comprises a metallocene complex supported on a porous silica support having an average particle size of from 10 to 120 μm, a pore volume of ≥0.5 and ≤3.0 $cm^3/g$, and a surface area of ≥50 and ≤500 $m^2/g$, as determined in accordance with ISO 9276-2 (2014).

8. Process according to claim 3, wherein the process is continuously operated by providing to a reactor a continuous supply of a reactant feed comprising ethylene, a continuous supply of the metallocene-type catalyst system, and a continuous supply of the antistatic agent, such that the molar ratio of the metallocene complex in the metallocene-type catalyst system to the antistatic agent is maintained in the range of ≥0.01 and ≤100, and wherein a product stream comprising the polyethylene produced in the polymerisation reactor is withdrawn continuously from the reactor.

9. Process according to claim 8, wherein the reactant feed further comprises one or more α-olefins comprising 3 to 10 carbon atoms.

10. Process according to claim 9, wherein the α-olefin comprising 3 to 10 carbon atoms is 1-butene, 4-methyl-1-pentene, 1-hexene or 1-octene.

11. Process according to claim 9, wherein the reactant feed comprises ≥5.0 and ≤20.0 wt % of the α-olefin comprising 3 to 10 carbon atoms with regard to the total weight of ethylene and the α-olefin comprising 3 to 10 carbon atoms.

12. Process according to claim 1, wherein the antistatic agent is present in an amount of ≥1 and ≤1000 ppm by weight with regard to a weight of the polyethylene that is produced.

13. Process according to claim 1, wherein each of R1, R2 and R3 in formula I is independently a moiety according to formula II.

14. Process of claim 13, wherein RI, R2 and R3 in formula I are the same.

15. Process according to claim 1, wherein each of R4, R5 and R6 in formula II is independently a linear or branched hydrocarbon moiety comprising 1-5 carbon atoms.

16. Process according to claim 15, wherein R4, R5 and R6 in formula II are the same.

17. Process according to claim 1, wherein the antistatic agent is a compound selected from tris(trimethylsilyl)amine, tris(triethylsilyl)amine, tris(triisopropylsilyl)amine, tris(triisobutylsilylamine), N,N-bis(trimethylsilyl)methyl amine, N,N-bis(trimethylsilyl)dodecylamine, and N,N-bis(trimethylsilyl)octadecylamine.

18. Process according to claim 1, wherein the process is performed in a fluidised bed reactor.

19. Process for the production of a polyethylene comprising polymerizing a reaction mixture comprising ethylene in the presence of a catalyst system and an antistatic agent according to formula I:

formula I wherein R1, R2 and R3 stand for a moiety according to formula II or a hydrocarbon moiety having 1 to 20 carbon atoms

formula II wherein each of R4, R5 and R6 is the same or different, and wherein each of R4, R5 and R6 is a hydrocarbon moiety having 1 to 10 carbon atoms, and wherein at least one of R1, R2 and R3 is a moiety according to formula II,
wherein the catalyst system is a metallocene-type catalyst system, and
the process is continuously operated by providing to a reactor a continuous supply of a reactant feed comprising ethylene, a continuous supply of the metallocene-type catalyst system, and a continuous supply of the antistatic agent, such that the molar ratio of the metallocene complex in the metallocene-type catalyst system to the antistatic agent is maintained in the range of ≥0.01 and ≤100, and wherein a product stream comprising the polyethylene produced in the polymerisation reactor is withdrawn continuously from the reactor.

* * * * *